United States Patent
Ginzburg et al.

(10) Patent No.: US 8,311,960 B1
(45) Date of Patent: Nov. 13, 2012

(54) INTERACTIVE SEMI-SUPERVISED MACHINE LEARNING FOR CLASSIFICATION

(75) Inventors: Ilan Ginzburg, Saint Pancrasse (FR); Bruno Roustant, Froges (FR); Pierre Salagnac, Saint Martin d'Hères (FR)

(73) Assignee: EMC Corporation, Hopkinton, MA (US)

( * ) Notice: Subject to any disclaimer, the term of this patent is extended or adjusted under 35 U.S.C. 154(b) by 897 days.

(21) Appl. No.: 12/415,447

(22) Filed: Mar. 31, 2009

(51) Int. Cl.
*G06F 15/18* (2006.01)
*G06N 3/00* (2006.01)
*G06N 3/12* (2006.01)

(52) U.S. Cl. .......................................... 706/13

(58) Field of Classification Search .............. 706/12–13; 707/749
See application file for complete search history.

(56) References Cited

U.S. PATENT DOCUMENTS

| | | | |
|---|---|---|---|
| 6,470,307 B1* | 10/2002 | Turney ................. | 704/9 |
| 8,010,614 B1* | 8/2011 | Musat et al. ................ | 709/206 |
| 2003/0037041 A1* | 2/2003 | Hertz .................. | 707/1 |
| 2004/0096107 A1* | 5/2004 | Ii et al. .................. | 382/224 |
| 2007/0100812 A1* | 5/2007 | Simske et al. ............. | 707/5 |
| 2007/0185824 A1* | 8/2007 | Hitt ................... | 706/25 |
| 2007/0219988 A1* | 9/2007 | Mueller et al. .......... | 707/5 |
| 2008/0313180 A1* | 12/2008 | Zeng et al. ............. | 707/6 |
| 2009/0234878 A1* | 9/2009 | Herz et al. ............. | 707/102 |
| 2010/0145678 A1* | 6/2010 | Csomai et al. ............ | 706/12 |
| 2010/0153360 A1* | 6/2010 | Waldo et al. ............. | 706/54 |
| 2011/0173145 A1* | 7/2011 | Wu et al. ............... | 706/13 |

OTHER PUBLICATIONS

Lopez-Herrera, A.G. et al. "Applying multi-objective evolutionary algorithms to the automatic learning of extended Boolean queries in fuzzy ordinal linguistic information retrieval systems". Fuzzy Sets and Systems 160. pp. 2192-2205. Available online Feb. 26, 2009. doi:10.1016/j.fss.2009.02.013.*

Lopez-Herrera, A.G. et al. "Multi-objective Evolutionary Algorithms in the Automatic Learning of Boolean Queries: A Comparative Study". Theor. Adv. and Appl. of Fuzzy Logic, ASC 42, pp. 71-80, 2007.*

Pei, M. et al. "Genetic Algorithms for Classification and Feature Extraction". 1995. http://citeseerx.ist.psu.edu/viewdoc/summary?doi=10.1.1.67.4377.*

Ko, S-J. et al. "Optimization of Association Word Knowledge Base through Genetic Algorithm". DaWaK 2002, LNCS 2454, pp. 212-221, 2002.*

(Continued)

*Primary Examiner* — David R Vincent
*Assistant Examiner* — Benjamin Buss
(74) *Attorney, Agent, or Firm* — Dergosits & Noah LLP; Todd A. Noah (57) ABSTRACT

The invention is a system and method for teaching and using a computer to apply a genetic algorithm in order to generate rules for classifying data objects, such as documents. By permitting periodic human intervention during and/or after the initial training stage, the invention improves upon existing methods that merely automate data classification. Using an initial "training set" of data objects, the system develops a set of rules to apply on future data objects. To improve efficacy over time, rules may be periodically amended by a user during the initial training stage or after rules have been generated. In this fashion, classification rules may evolve, thereby improving the accuracy and speed of the classification process. Classification rules are also presented in a human-readable format, thereby improving the transparency of the classification process and facilitating the interaction between the system and the administrator.

20 Claims, 6 Drawing Sheets

OTHER PUBLICATIONS

Niimi, A. et al. "Category-based Extracting Keyword Method Selection with Genetic Programming". Joint 1st Int'l Conf. on Soft Computing and Intelligent Systems (Int'l Session of 18th SOFT Fuzzy Systems Symposium) and 3rd Int'l Symposium on Adv. Intelligent Systems (SCIS&ISIS 2002). 5 pages. http://hdl.handle.net/10445/3909.*

Horng, J-T. et al. "Applying genetic algorithms to query optimization in document retrieval". Information Processing and Management 36 (2000) pp. 737-759.*

Fan, W. et al. "Ranking Function Optimization for Effective Web Search by Genetic Programming: An Empirical Study". Proceedings of the 37th Hawaii International Conference on System Sciences, 2004. IEEE.*

Trappey, A.J.C. et al. "Development of a patent document classification and search platform using a back-propagation network". Expert Systems with Applications 31 (2006) pp. 755-765. doi:10.1016/j.eswa.2006.01.013.*

* cited by examiner

GenYVV

European Union
Competition
Culture
Internal Market
Agriculture
Consumers
Energy

Accuracy: ○ 88.95%

Recall: 92.30%
Precision: 96.37%

Candidate threshold
Value: 43  ☐ Forced

On target threshold
Value: 70  ☐ Forced

Keywords

| Keyword | Confidence | Proximity | Stemming | Type |
|---|---|---|---|---|
| figel | | | 30 | Recommended |
| frederic | | | 29 | Recommended |
| bologna | | | 29 | Recommended |
| education | | | 26 | Recommended |
| divide | | | 16 | Recommended |
| presidency | | | 14 | Recommended |
| formally | | | 12 | Tentative |
| media | | | 10 | |

Tentative
Forced
Forced, fixed confidence
Forbidden

— 681

Add
Remove

Sequences

| Phrase | Confidence | Proximity | Order | Stemming | Type |
|---|---|---|---|---|---|
| intercultural di... | | 35 | 3 | | Recomme... |
| jan figel | | 32 | 3 | | Recomme... |
| lifelong learn | | 32 | 3 | | Recomme... |
| europa eu | | 16 | 3 | | Recomme... |

— 691

Add
Remove

INTERACTIVE SEMI-SUPERVISED MACHINE LEARNING FOR CLASSIFICATION

FIELD

The present invention relates generally to classifying data objects, and specifically, to applying a genetic algorithm to improve the classification of data objects.

BACKGROUND

As organizations generate and retain large amounts of data, it becomes increasingly important for those organizations to effectively classify this data. Data may be classified using information about the data, such as the names of data files, the names of the users that created or modified the data, or the source or location of the data. However, information about the data may not be useful to all users because such information lacks context. For example, when viewing a document data file, information about a document does not provide the document's purpose or its subject matter. Only someone who has previously interacted with the document can provide this contextual information. Therefore, in order to give context to users who encounter a document for the first time, many organizations will use the document's content as a way to classify it. For example, documents pertaining to a certain subject or category may be located in the same folder, and the folder may be labeled with the name of the category. Classifying data by content makes it easier for a user to identify the data's general subject matter or purpose without having to review the data himself.

It can be extremely tedious to determine the content of data, since it requires that someone or something review the data and provide a category for classification. In situations where the data is a document file, someone must read the document to identify the appropriate classification for that document. In order to increase efficiency, organizations are developing and applying various "classifier algorithms" in order to automate the data classification process. Applying a classifier algorithm to classify data is known as "statistical classification," since the algorithm is typically based upon a statistical analysis of the data for classification. Statistical classification may apply one or more known classifier algorithms, such as Naïve Bayes, Maximum Entropy, Support Vector Machines, Decision Tree, Neural Network (Multi-layer Perceptron), k-Nearest Neighbors, Gaussian Mixture Model, Gaussian, etc. A programmer may write a computer program to statistically classify one or more sets of data files into common categories based on information within the files, i.e. their content. The computer program may also "study" a set of documents that have been previously classified by category in order to locate other documents that share the classified documents' category. In either case, the computer program will typically require "training" or "machine learning" in order to learn what content matches which category.

An exemplary training session may begin with an initial set of data or document files, and the computer classifier algorithm program may be given a list of terms or patterns to search for in the initial data set. The computer program may also be given a list of categories that are appropriate for those terms or patterns. The computer program thereby "learns" how to classify data by looking for keywords or patterns, then matching those keywords or phrases to a pre-determined category. Thus, when the training session is complete, the computer can run the program on other sets of data during one or more classification sessions. During these later classification sessions, the computer program will apply what it learned from the training session and will search for certain terms or patterns in a data file, and once a sufficient amount of these terms or patterns are found in the file, the computer program will assign a category, or classify, the file.

Once the training session has ended, there is often no way to add additional terms, patterns or categories to the classifier algorithm program. The accuracy of the classifier algorithm program is often dependent upon the initial training session. The more terms, patterns and matching categories that are provided to the computer during the training session, the more accurate the classifier algorithm results. Therefore, it is important that during the training session, the computer receives every possible term and pattern, as well as every possible category, to ensure that the particular classifier algorithm may be used in future classification sessions. However, it is difficult to predict the content of future data. As a result, terms and patterns and/or categories missing from the initial training session can handicap the subsequent classification sessions, resulting in inaccurate data classifications. What is therefore needed is a way to implement a classifier algorithm that accepts new terms, patterns and categories, even after a training session. In other words, what is needed is a classifier algorithm that can "evolve" for future sessions, or that can build upon the knowledge gained from previous sessions.

The concept of algorithms that evolve, i.e., "evolutionary algorithms," is often applied in situations where solutions are mere optimizations rather than concrete and consistent results, or where there may not be exact solutions for a problem. Evolutionary algorithms are commonly used in search engine technology, and include Hill Climbing, Simulated Annealing, Genetic Algorithms and other mathematical optimization techniques. These algorithms apply concepts inspired by evolutionary biology, namely, recombination, selection, mutation and reproduction. In general, an evolutionary algorithm works with an initial set of data, called an "initial population." The initial population may be a randomly selected set of solutions for a problem. For example, if the problem is the fastest route to a particular destination on a map, the initial population may be a four or five routes selected from an infinite number of pathways. From this initial population, two or three may be selected as the shortest routes. Two of these routes may be then combined to result in a new offspring route population, i.e., recombination. Alternatively or additionally, a change to one of the routes, or "mutation," may be introduced, resulting in a different offspring population. The offspring populations of recombination or mutation may then be used to render another set, or population of routes. Each new population creation session can be thought of as a successive generation. Depending upon the way the routes are viewed, the "best" route or routes may ultimately emerge from each subsequent generation.

As previously mentioned, evolutionary algorithms are effective when trying to discover optimized solutions for a problem with changing variables. For example, evolutionary algorithms are typically used in Internet search engine technology because the population of search results continues to grow, and each search is likely to yield different and often better results each time the search is performed. Evolutionary algorithms are also useful in robotics, engineering design, cryptography and other multi-variable problems. Because of its inherent ability to solve these types of problems, it would be beneficial to apply an evolutionary algorithm to the field of data classification.

However, simply applying an evolutionary algorithm does not guarantee optimal or easily understood results. These types of algorithms are typically left to solve problems independently by applying automated encoded mathematical operations. Similar with other encoded classifier algorithms, these operations and computer programs are not readable by humans because they resemble computer program code or utilize mathematical notations that are incomprehensible to most laypeople. As such, even if someone wanted to view, edit or optimize the algorithm, he would be unable to do so easily without having the requisite knowledge. What is therefore needed is a classifier algorithm that enables any user to edit, add or remove terms, patterns and categories used for classification.

In general, what is needed is a more improved and easily implemented classifier algorithm and method. This improved method should be able to classify data, such as document files, without regard to origin or subject. What is further needed is a way to effectively monitor the method of classification in order to improve the method. What is further needed is a way to easily modify the method of classification, if necessary.

BRIEF DESCRIPTION OF THE FIGURES

The present invention is illustrated by way of example and not limitation in the figures of the accompanying drawings, in which like references indicate similar elements, and in which.

DETAILED DESCRIPTION

The invention is a computer-based system and method for applying a genetic algorithm in order to generate rules for classifying data. The invention can learn from data that has previously been classified by a computer or a human, and can build upon that knowledge by perfecting the rules used by the computer or human. In the examples below, the invention is used to classify documents into known categories; however, one having skill in the art will appreciate that the invention may be used to classify any type of computer-readable data. In an embodiment, the invention comprises a classification method that may be periodically evaluated and adjusted in order to improve the accuracy and precision of the classification algorithm. In addition, the rules used to perform the classification are presented in a human readable format, thereby facilitating interaction with the classification engine. After documents have been classified, the classification information can be exported and made available for other applications.

It should be appreciated that the present invention can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

A. System Architecture

Figure 1:
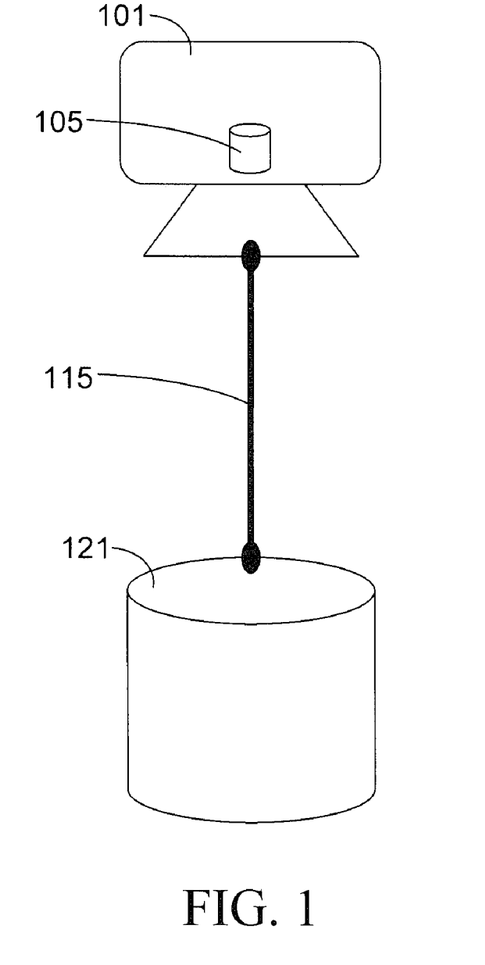
FIG. 1 is an exemplary block diagram depicting a system embodiment of the present invention.

FIG. 1 illustrates a system embodiment of the present invention. Computer 101 may comprise any hardware having a processor and memory 105, such as any computer readable storage medium. A computer program product having computer readable instructions or computer program code for implementing the method embodiment of the invention may be stored in memory 105. In addition, data for classification may be stored in memory 105, or computer 101 may be configured to access data for classification stored on another computer, server or other computer readable storage medium. For example, computer 101 may access a computer 121 over a network 115, and computer 121 may store data for classification. Other configurations are also possible without departing from this disclosure or the scope of the invention.

B. Genetic Algorithm and Machine Learning

An embodiment of the invention uses a computer program product to perform a method for applying a genetic algorithm to generate rules for classifying data. The genetic algorithm is a type of evolutionary algorithm that accepts results from a previous generation, as well as recombinations ("crossovers"), mutations or other changes to those results. Those results are used to generate increasingly better results in the next generation. Even though in the following example, a genetic algorithm is used, one will appreciate that other evolutionary algorithms may also be used.

Figure 2:
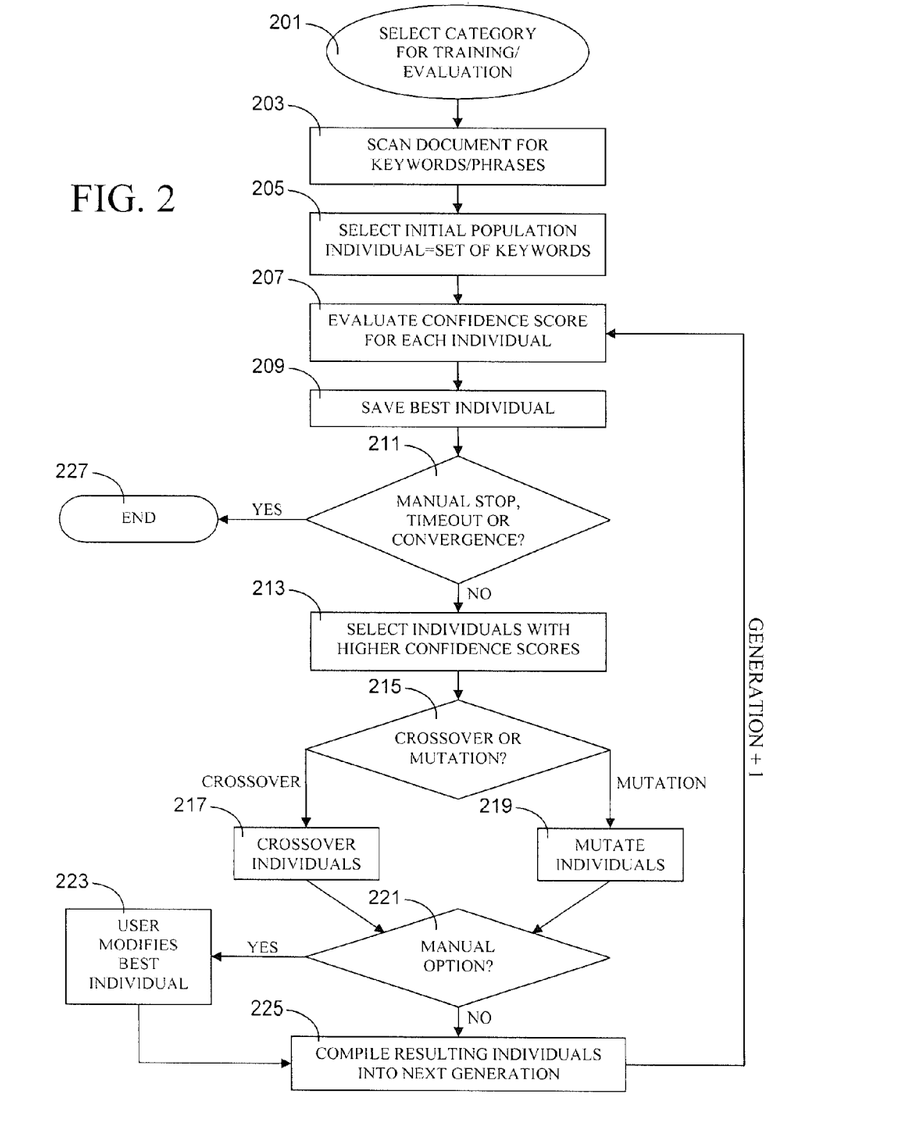
FIG. 2 is an exemplary flow diagram illustrating the steps of an embodiment of the present invention.

FIG. 2 illustrates an exemplary method for training a computer to apply a genetic algorithm for generating rules for data classification. FIGS. 3, 4, 5 and 6 are screenshots of an exemplary user interface that may be displayed while the method of FIG. 2 is performed. One having skill in the art will appreciate that the steps shown in FIG. 2 and described below are merely exemplary and may be performed in a different order without departing from this disclosure or the scope of the invention. Similarly, the user interfaces shown in FIGS. 3-6 are not meant to be limiting in any fashion. The options, graphics, buttons and selections shown in FIGS. 3-6 may be changed or removed.

Figure 5:
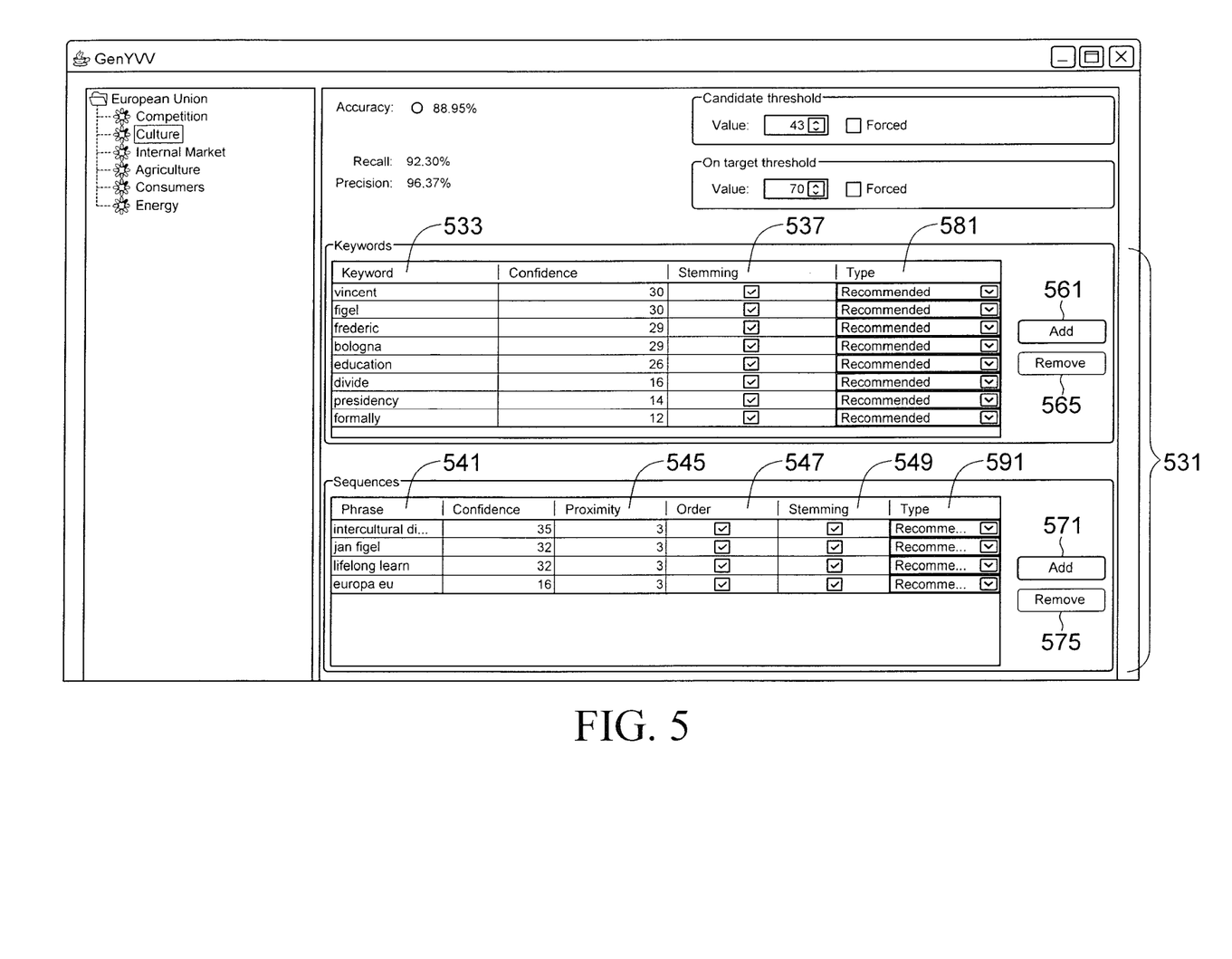
FIG. 5 is an exemplary screenshot showing a computer program embodiment of the present invention.
Figure 6:
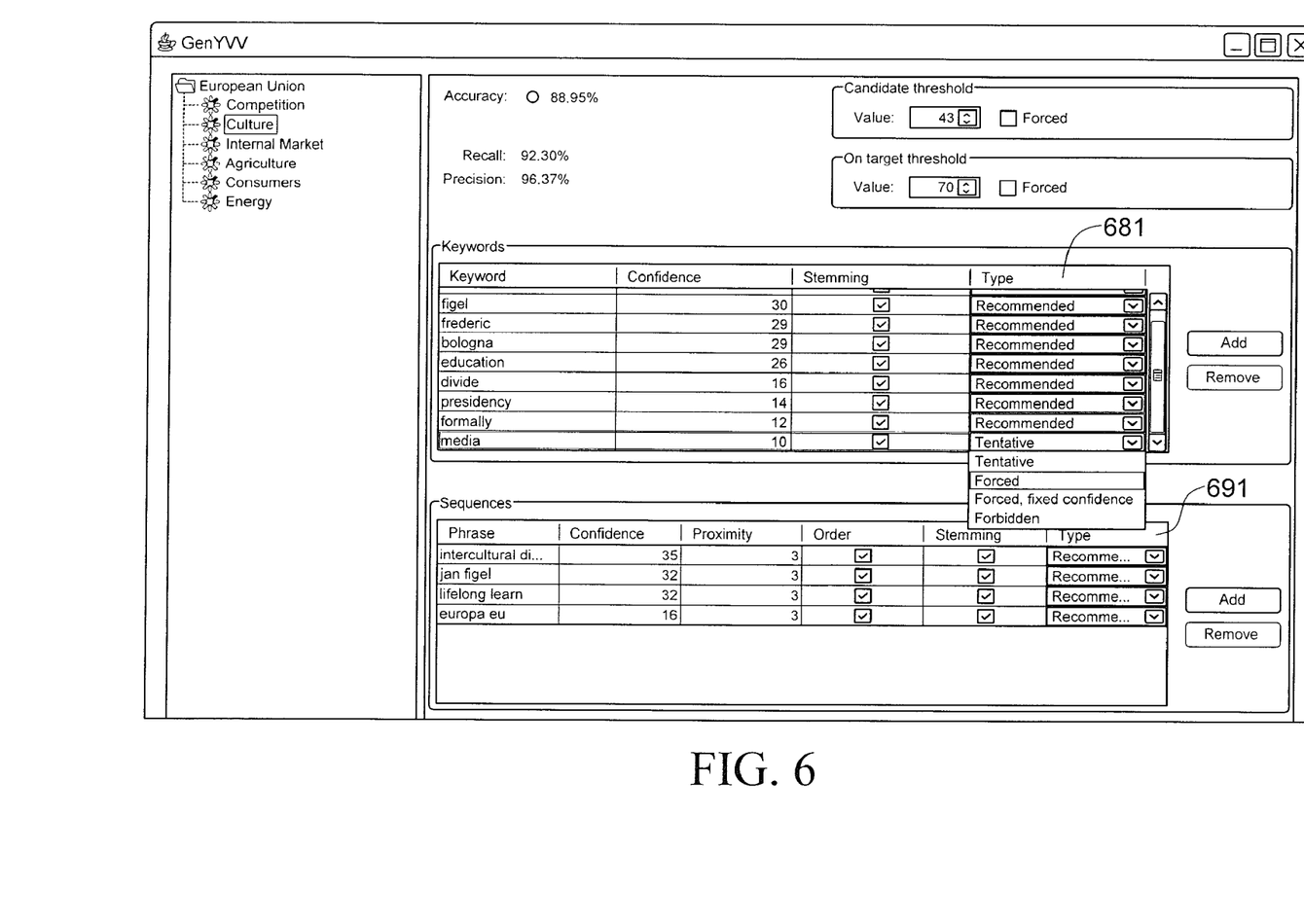
FIG. 6 is an exemplary screenshot showing a computer program embodiment of the present invention.

In the following examples and throughout, a computer program performs much of the steps of the inventive method. However, one having skill in the art will appreciate that certain steps may be performed by a human user, thereby providing interaction with the computer program product. As will be discussed below, a user can supervise the machine learning and classification processes, and can also intervene where necessary. The various steps that may be performed by a user instead of a computer are detailed below, and are shown in FIGS. 2, 5 and 6.

Turning now to FIG. 2, step 201 illustrates a first step of the method embodiment of the invention: Select Category for Training/Evaluation. In an embodiment, the computer program product may run a "machine learning," or training session, in order to generate classification rules. In addition, the computer program may run a classification session based upon the rules generated from the training session. The purpose of the training session is to discover what type of content corresponds to a particular category. As will be illustrated below, the training session may be completely automated, or may be supervised by a user who may have the opportunity to identify content appropriate to a category. In an embodiment, each category may have its own respective training session; however, training sessions need not be run one at a time. Depending upon the constraints of the computer 101 running the computer program product, multiple training sessions may run concurrently. In either scenario, the computer program product engages in machine learning to identify relevant content in the data, and then evaluates how well it identifies this relevant content. As will be discussed further below, a user will also have the opportunity to evaluate the progress of the training session, and will be able to intervene in order to improve the process.

In the following example, the data used for training and classification is in the form of document files. Keywords in the files are actual terms in the text of the document files. Groups of keywords may be termed "phrases." In this example, the computer program analyzes documents that have been previously classified by a user into one or more categories, discovers what keywords from those documents correspond to those categories, then stores these keywords so that the computer program product may classify future documents that have not been assigned to any category. In an embodiment, some of the keywords may be supplied by a user who has requisite knowledge of the category. Keywords suggested by the user may be incorporated into crossover or mutation operations by the computer program. Further, the computer program may use these keywords to evaluate if all documents in a category have been properly classified by running the program to check if the keywords exist in all documents in the category.

Figure 3:
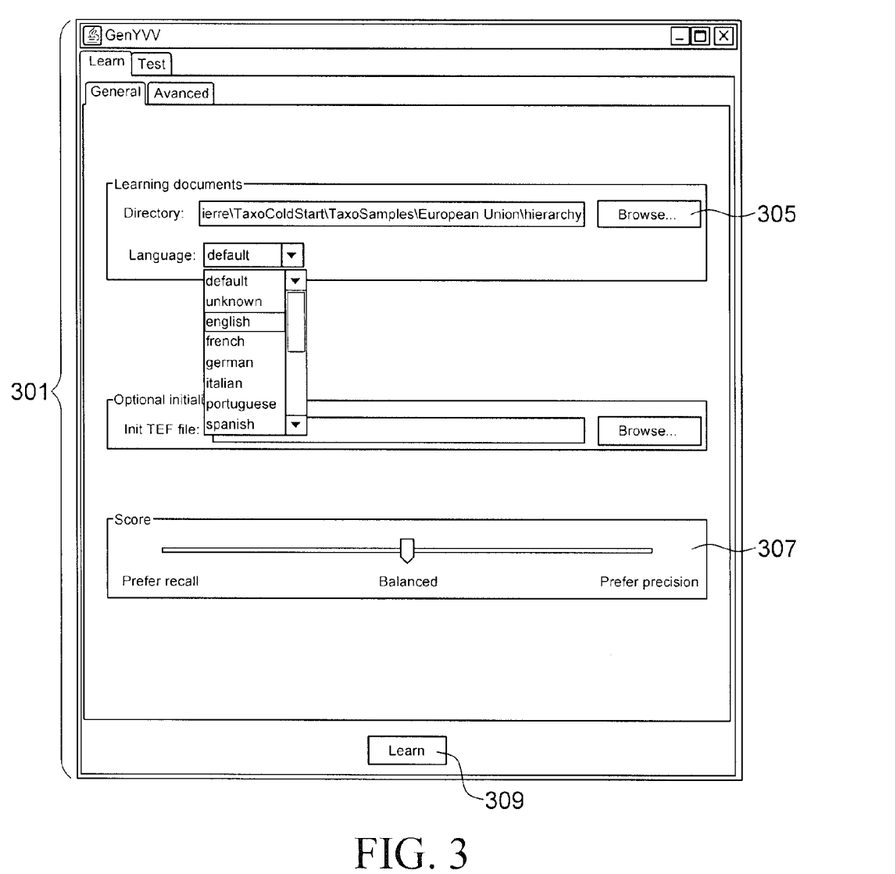
FIG. 3 is an exemplary screenshot showing a computer program embodiment of the present invention.

After initiating or launching the computer program product, the user may be presented with a user interface such as the program window shown in FIG. 3. In an embodiment, the program window may present the user with the option of navigating to the directory or location where the documents are stored. As previously discussed, the documents may already be stored in a folder for a particular category, which corresponds to step 201 of FIG. 2 in which a user selects a category for training/evaluation. If the category corresponds to a file folder, then this folder may be provided to the computer program using the Browse feature (305 of FIG. 3). The user may also have the option to set the "Confidence Scoring" preference for the training session using Scale (307 of FIG. 3). Confidence Scoring is discussed in more detail below. Once these settings are entered, the user may continue to the training session by selecting Learn (309 of FIG. 3). One will appreciate that the button labels shown in FIG. 3 are merely exemplary and may be different in other versions of the computer program. One will also appreciate that other features not described may be made available to the user without departing from this disclosure or the scope of the invention.

A single document file may be used for training; however, one having skill in the art will appreciate that the more documents that are used to train for a category, the larger a sampling from which to identify keywords and phrases. As the following example will illustrate, in order to implement the genetic algorithm feature of the invention, it may require at least two documents, or at least two sets of keywords or phrases, in order to incorporate crossovers or mutations between the two sets. One will appreciate that where two sets of keywords or phrases are used, one set may be generated by the computer program, and the other set may be generated by a user. Alternatively, both sets of keywords may be generated by the computer program. The computer program may be configured to run the training session by itself until a user intervenes and adds his own set of keywords for incorporation by the program. User intervention may include the user suggesting a complete set of keywords or phrases, or modifying the set of keywords or phrases generated by the computer program.

As previously discussed, the machine learning or training session involves identifying which keywords or phrases correspond to the selected category. The step of identifying may involve scanning the one or more documents for keywords (step 203 of FIG. 2). The computer program may use OCR or any character recognition technology known in the art for scanning. In an embodiment, keywords may be provided to the software program, which may then search the document for the provided keywords. Alternatively or additionally, the software program may perform the search itself and use term frequency to determine what keywords or phrases are present in the document. In an embodiment, some keywords or phrases are identified by a user.

Figure 4:
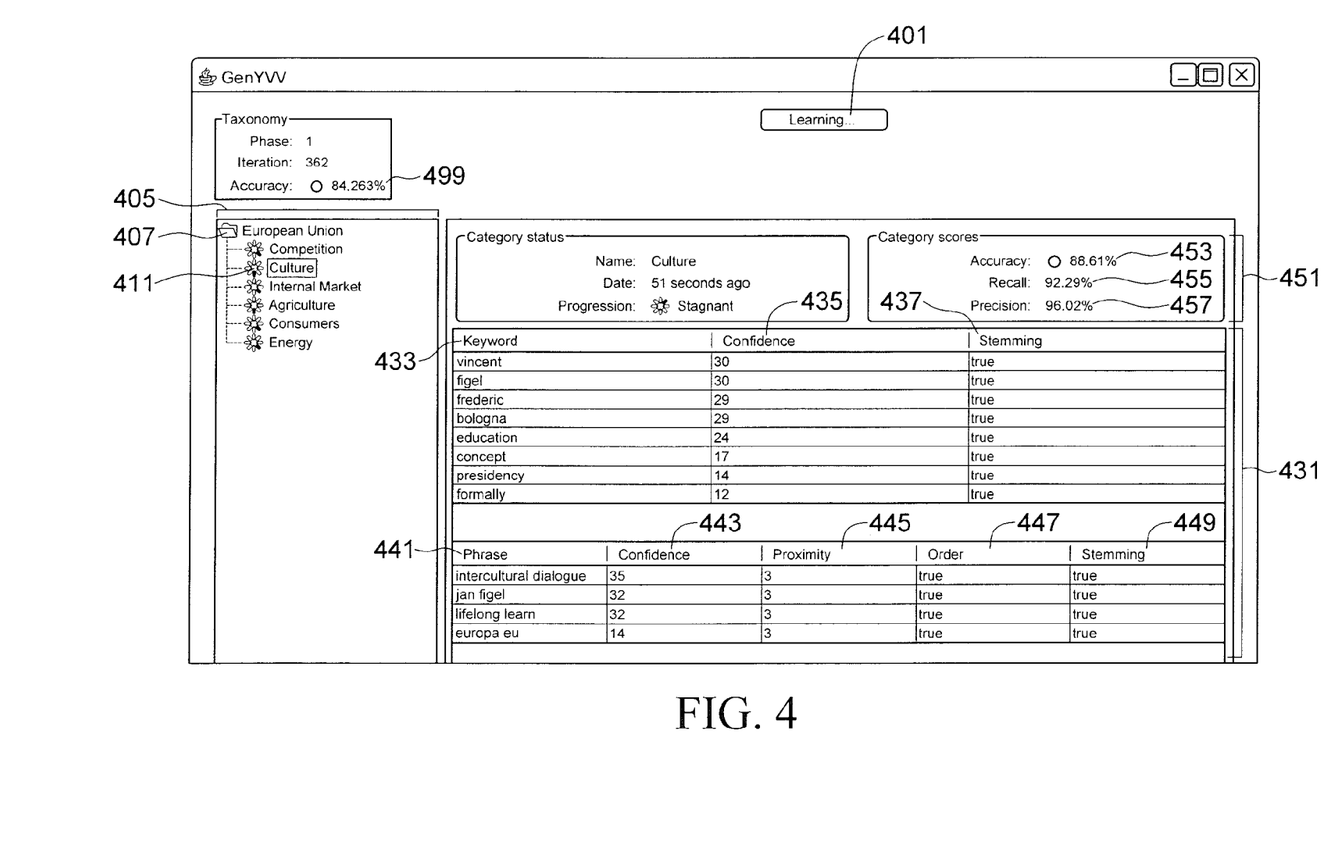
FIG. 4 is an exemplary screenshot showing a computer program embodiment of the present invention.

After the user selects "Learn" as shown in FIG. 3, the user may be presented with information concerning the training session in progress. FIG. 4 is an exemplary screenshot of a training session in progress. As shown, 401 is a progress bar representing that the training session is in progress. Frame 405 shows a list of documents used for training or further classification. For example, in the data File Folder 407 called "European Union," various sub-categories are listed such as Competition, Culture (411), Internal Market, Agriculture, Consumers and Energy. As previously mentioned, these categories may have been assigned in a previous training session or classification session, or may have been assigned by a user. Frame 431 is an example of information collected by the software program during the training session. As shown, Frame 431 provides a column with a listing of Keywords 433, a Confidence Score 435 and whether variations of the Keywords 433 may be included in the search ("Stemming" 437). Stemming will be explained further below. Similarly, Frame 431 also shows that pairs of keywords, or Phrases 441, have respective Confidence Scores 443 and Stemming 449, as well as additional factors such as Proximity 445 and Order 447. Phrases 441 are explained further below.

FIG. 4 illustrates that in step 201 of FIG. 2, the user has identified category 411 Culture in 305 of FIG. 3. This corresponds to the highlighted portion around the term "Culture"

in Frame 405 of FIG. 4. FIG. 4 also illustrates that the computer program is scanning one or more documents in the Culture category 411 (step 203 of FIG. 2), and has identified the list of words below Keywords 433: vincent, figel, frederic, bologna, education, concept, presidency and formally. These keywords may be termed an "initial population" of keywords. In genetic algorithm parlance, this set of keywords may also be known as an "individual" (step 205 of FIG. 2).

In an embodiment, the computer program calculates a Confidence Score 435 (step 207 of FIG. 2) for each of the keywords in a set, and may save those sets of keywords (i.e., "individuals") that have the highest confidence scores (step 209 of FIG. 2). One will appreciate that a confidence score may also be referred to as "fitness," such that keywords that are better, or more "fit," will have a higher confidence score. In this example, the higher the confidence score, the more "confident" the computer program is that the identified keyword is a good or accurate keyword. As such, the confidence score for an accurate or fit keyword will increase over time with each successive generation. By identifying those keywords with the highest confidence scores, the computer program product saves the best individuals for use in later generations (step 209 of FIG. 2).

In an embodiment, the confidence score is calculated using the number of times a keyword appears in a document, divided by the total number of words in the document ("positive frequency"). In this fashion, the more times a keyword appears in the document, the higher its confidence score. In an embodiment, the confidence score may be calculated using the number of times a keyword appears in all the documents from the category used for training, or the number of documents that contains the keyword divided by the total number of documents in the category ("positive coverage"). Without relying on any particular method of calculation, FIG. 4 shows that the computer program has determined that the Confidence Score 435 for the keyword "vincent" is 30.

Stemming is another feature that may be built into the computer program of the invention. Frame 431 of FIG. 4 shows that all of the Stemming 437 settings for the keywords are set to "true." In an embodiment, this may be a default setting. Stemming refers to whether or not variations are being included in the scanning step. If stemming is set to "true," then in an embodiment, the computer program is searching for all variations of the keyword. For example, the computer program may be searching for "vincent," "vincents" or "vincente." In other words, noun keywords may be discovered in either singular or plural form and verb keywords may include all known conjugations. Other forms of the verb may be searched as well. Conversely, if the Stemming 437 is set to "false," then the computer program may only search for exact forms of the keyword as shown in the corresponding keyword box 433 for that Stemming 437 setting.

As mentioned previously, in an embodiment, the computer program also searches for phrases, which are groups of keywords. In FIG. 4, Phrases 441 is a list of the phrases found in the training document from 411 Culture. As FIG. 4 illustrates, the computer program located the phrases "intercultural dialogue," "jan figel," "lifelong learn" and "europa eu." As with Keywords 433, Phrases 441 each have an associated Confidence Score 443 calculated by the computer program. Proximity 445 is the number of words between the first keyword of the phrase and the last keyword of the phrase. For example, for phrase "intercultural dialogue," the computer program is set to count each instance where the keyword "intercultural" is within three words of "dialogue," since Proximity 445 for the phrase "intercultural dialogue" is set to the number 3. In addition, the Order 447 denotes that the computer program is searching for instances where the keyword "intercultural" appears before "dialogue." For example, "intercultural dialogue" would be considered by the computer program, but "dialogue intercultural" would not. Additionally, Stemming 449 is set to "true," so the computer program is searching for variations of the phrase "intercultural dialogue." As with the Keywords 433 training, the Confidence Score 443 for Phrases 441 may increase as the training session progresses.

In an embodiment, the training session is an automated process. In other words, the computer program will continue to identify keywords in a document until either (1) the user stops the training session; (2) the training session has continued for a pre-determined period of time; or (3), the computer program product notes that the confidence scores for the identified keywords or phrases have reached a certain set threshold or are no longer increasing (step 211 of FIG. 2). If any of these conditions exist, then the training session ends (step 227 of FIG. 2). However, if any of these conditions are lacking, then the training session will continue, and will select the sets of keywords, i.e., individuals, with the higher confidence scores (step 213 of FIG. 2). From this selected group, the computer program product may elect to perform a recombination, or "crossover," in order to discover the best individual from a group of two individuals. Therefore, in the current example, if scanning and scoring one document from the Culture 411 category results in one set of keywords (a first individual), and if scanning and scoring another document from the Culture 411 category results in a second set of keywords (a second individual), then those two individuals may be combined to form a new individual, or offspring. If the highest scoring keywords from each individual are used, then presumably the resulting offspring will be a combination of these high scoring keywords.

The computer program product embodiment of the invention may also consider mutations as well. In nature, mutations can often result in stronger offspring even though it would not have been predictable that such an offspring would result. Carrying that concept forward to genetic algorithms, and data classification, one may envision creating offspring from two individuals that may not necessarily be comprised of high scoring keywords. An individual of low scoring keywords, or an individual with a mix of high and low scoring keywords may be used in combination with another individual to create offspring as well. In FIG. 2, the determination of whether to perform a crossover or mutation is shown in step 215. This may be a random selection by the computer program product, a previously setting configured by the user, or may be in accordance to a schedule. The crossover step is performed in step 217, and the mutation step is performed in step 219. One will also appreciate that both crossover and mutations may be performed by the computer program product. One will also appreciate that in order to generate better results from a crossover or mutation step, the computer program product may require two individuals, each from a separate document in the selected category, or two individuals selected from the same document in the selected category.

As noted above, in FIG. 4, the Confidence Scores 435 may increase and the list of identified Keywords 433 may change as training progresses and the program performs various crossovers and/or mutations to the individuals. In addition, as is shown in box 451, the Accuracy of the classification may increase. Box 451 lists Accuracy 453, Recall 455 and Precision 457.

The computer program uses Recall 455 and Precision 457 to calculate the Accuracy 453 for the category used for training. This calculation is discussed in more detail below. In addition to the Accuracy 453 for the particular category, there is an overall Accuracy 499 for the entire File Folder 407.

FIG. 4 illustrates that the training session is fully transparent. A user can observe the computer program as it engages in machine learning to identify keywords and phrases for future classification, and can stop the process in order to improve or otherwise control the training session. In step 221 of FIG. 2, the computer program checks to see if it is currently configured to allow for manual intervention. If not, then in step 225, the computer program compiles the results of the crossover and/or mutations discussed above, then continues to identify a list of higher scoring keywords and phrases to create new individuals (step 207-209). As previously discussed, this will continue until the user manually stops the program, the program times out or if confidence scores reach some set threshold or no longer increase (step 227). The end result of the method shown in FIGS. 2, 3 and 4 is a usable exportable list of keywords and phrases (i.e., rules) for the category selected in step 201. Other options available to a user after the concluding the method of FIG. 2 is discussed further below.

As mentioned above, step 221 of FIG. 2 includes a check to see if the manual option has been selected by the user, thereby giving the user to add his or her own expertise to the list of keywords and phrases already identified during the session. If the manual option is selected, then in step 223, the user will be given the opportunity to add to, remove from or otherwise edit the list of keywords and phrases identified by the computer program. FIGS. 5 and 6 are exemplary screenshots of user interfaces that may be presented to a user when the manual option is activated.

As shown in FIG. 5, there are a series of Stemming 537 checkboxes for Keywords 533, and a series of Stemming 549 for Phrases 541. A checked checkbox may indicate that Stemming 537 or Stemming 549 is set to "true," whereas an unchecked checkbox may indicate that Stemming 537 or Stemming 549 is set to "false." In this fashion, the user may decide whether or not to continue training with variations of a keyword or phrase, or to limit training to the exact form of a keyword or phrase. Similarly, there may be checkboxes for Order 547, which allows the user to decide whether or not Phrases 541 should be searched in the exact order portrayed in the list of Phrases 541 or if the Phrases 541 may be considered no matter the order of keywords comprising the phrase. One will also appreciate that the user may be able to vary the Proximity 445 if desired.

In Frame 531, there are Boxes 561 and 571 labeled "Add," and Boxes 565 and 575 for "Remove." In an embodiment, Box 561 gives the user the ability to add keywords for classification, and Box 565 gives the user the ability to remove keywords from classification. Similarly, Box 571 gives the user the ability to add phrases for classification, and Box 575 gives the user the ability to remove keywords from classification. In this fashion, the user has the option to focus future classification sessions using selected keywords and phrases. More importantly, the user can augment the training session with his own knowledge of the document content, thereby increasing the accuracy of the training session and future classification sessions. This is illustrated further in FIG. 6.

Frame 531 also displays a column labeled Type 581 for Keywords 533, and a column labeled Type 591 for Phrases 541. This is shown in more detail in FIG. 6. In FIG. 6, Type 681 corresponds to Type 581 in FIG. 5, and Type 691 corresponds to Type 591 in FIG. 5. Types 681 and 691 are drop box menus that permit the user to determine the "Type" for each Keyword or Phrase. In an embodiment, there are four types: Recommended, Tentative, Force, Forced with Fixed Confidence and Forbidden. Recommended is the default Type set by the computer program, and signifies that the identified keyword is recommended as a keyword by the computer program. The user may change this Type to Forbidden if he no longer wishes to include the identified keyword in future classification sessions. If a user adds a keyword using Box 565, then the computer program automatically lists the added keyword Type as Tentative, since the computer program did not identify this keyword. When the training session is resumed, this Type may change to Recommended as the computer program searches for the term and calculates a Confidence Score. If the user wishes the computer program to locate an added keyword regardless of confidence score, then the Type may be set to Forced. Setting the Type to Forced will force the computer program to search for a keyword, but this will not affect the Accuracy scores (453 and 499 in FIG. 4). However, if the user wishes to affect the Accuracy scores, then the user may set the Type to Forced with Fixed Confidence and assign or generate a confidence score. The method by which confidence scores are used to calculate Accuracy scores is discussed further below. While the previous example illustrates how a user can change the Type for a Keyword, one will appreciate that similar options for changing the Type for a Phrase are also available.

FIGS. 5 and 6 therefore illustrate how a user can interact with the computer program product as it is identifying keywords and phrases from documents of a selected category. The ability to alter the training session is a byproduct of applying a genetic algorithm to the classification process. The machine learning training session is an automated process. However, by giving a user the option to oversee this process, the session becomes semi-supervised by the user. One will appreciate that intervention by a user will affect the accuracy measurement of the process, as shown in the Accuracy boxes 453 (for the category) and box 499 (overall). The method by which Accuracy is calculated is discussed below.

C. Classification Evaluation

The computer program embodiment of the invention uses two measures in order to evaluate the accuracy of the training and classification: Recall and Precision. One will appreciate that recall may also be referred to as "sensitivity." As a basic principle, Recall is a measurement of correctly classified documents ("true positives"), and Precision is a measurement of correctly non-classified documents ("true negatives"). Accuracy is a ratio of Recall to Precision converted to a percent value.

1. Recall

In an embodiment, Recall is a measurement indicating the invention's ability to correctly classify a document (true positives). Recall is a ratio between 0 and 1, where 1 is the best. In other words, a classification algorithm where all documents have been correctly classified for all appropriate categories will have a Recall of 1. The following calculation may used to compute a value for Recall.

$$recall = \frac{\sum_{docs} R(doc)}{positive.docs.count}$$

As shown, recall is the ratio of the number of correctly classified documents divided by the number of classified documents that are expected to be correctly classified, i.e., the number of positive results over the number of expected positive results. In addition, as a document is assigned with a strength or fixed confidence score (681 in FIG. 6), the R(doc) value is introduced in order to take into account the assigned strength.

$$R(\text{doc}) = \begin{cases} 1 & \text{if doc is assigned as expected and assignment strength is on target} \\ B\dfrac{\text{strength} - th_{candidate}}{th_{assigned} - th_{candidate}} & \text{if doc is assigned as expected but candidate} \\ 0 & \text{if doc is assigned incorrectly to the category (either on target or candidate)} \\ 0 & \text{if doc is not assigned to the category} \end{cases}$$

Another factor introduced into the equation is the "B" or "blur" factor, which is used to reduce the score of an almost assigned candidate, compared to the score of an on-target assignment. In a first approach, we take B=0.5. The addition of these factors is designed to have a fair measurement of the recall for the computer program, taking into account automated and manual results from the method shown in FIG. 2.

2. Precision

Precision is an indicator for the computer program's ability to reject documents that do not have the keywords or phrases identified for a selected category and therefore do not fit in the particular category, i.e., true negatives. In an embodiment, precision is a ratio between 0 and 1, where 1 is the best. One will appreciate that a document that is never assigned to a category does not modify the precision. Precision is computed using the ration of the number of correctly classified documents divided by the number of documents assigned to a particular category, i.e, (true positives)/(true positives+false positives).

$$\text{precision} = \dfrac{\sum_{docs} P(\text{doc})}{\text{assigned.docs.count}}$$

In addition, similar to the equation for recall, if a document has an assigned fixed confidence scores, a P(doc) value may be introduced to the equation in order to account for the assignment strength.

$$P(\text{doc}) = \begin{cases} 1 & \text{if doc is assigned as expected (for assignment strength either on target or candidate)} \\ 0 & \text{if doc is incorrectly assigned on target} \\ B - B\dfrac{\text{strength} - th_{candidate}}{th_{assigned} - th_{candidate}} & \text{if doc is incorrectly assigned but candidate} \\ 0 & \text{if doc is not assigned to the category} \end{cases}$$

Using the above measurements for Recall and Precision, the computer program is able to calculate and display a percent measurement for Accuracy, as shown in FIGS. 4, 5 and 6. Accuracy changes from iteration to iteration, since each generation will consider additional content information learned and discovered from the previous generation.

D. Further Applications

This disclosure describes the method by which the invention learns how to classify data by applying a genetic algorithm. There are numerous uses for the information that results from performing the method described above. The invention may be used as a software module for combination with other software modules that may find such a computer program useful. In an embodiment, the invention is able to export the results of a classification as an XML file. For example, an exported XML file for the Category "Culture" 411 from FIG. 4 may appear as the following:

```
<category name="Culture" classname="DefaultClass"
    type="dm_category" internalId="4">
  <definition candidateThreshold="44" onTargetThreshold="70">
    <evidence>
      <evidenceSet>
        <keyword name="vincent" confidence="30" stem="true"/>
        <keyword name="figel" confidence="30" stem="true"/>
        <keyword name="frederic" confidence="29" stem="true"/>
        <keyword name="bologna" confidence="29" stem="true"/>
        <keyword name="education" confidence="24" stem="true"/>
        <keyword name="concept" confidence="24" stem="true"/>
        <keyword name="presidency" confidence="14" stem="true"/>
        <keyword name="formally" confidence="12" stem="true"/>
        <keyword name="intercultural dialogue" confidence="35" stem="true" phraseOrderExact="true" phraseProximity="3"/>
        <keyword name="jan figel" confidence="32" stem="true" phraseOrderExact="true" phraseProximity="3"/>
        <keyword name="lifelong learn" confidence="32" stem="true" phraseOrderExact="true" phraseProximity="3"/>
        <keyword name="europa eu" confidence="14" stem="true" phraseOrderExact="true" phraseProximity="3"/>
      </evidenceSet>
    </evidence>
  </definition>
</category>
```

As shown, the Confidence Score for each keyword is included, as well as whether Stemming is set to true or false. In addition, phrases have additional tags for order and proximity. Any compatible program known in the art can use this XML file for classification purposes. For example, this may be stored with metadata for the directory containing the classified documents so that when the documents are backed up, there is an associated metadata file that describes the content of the backed up documents. One will appreciate that there are many uses for classifying documents and having an accurate description of classified documents.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the present invention. One will appreciate that these steps are merely exemplary and are not meant to be limiting in any way. Other steps and functions may be contemplated without departing from this disclosure or the scope of the present invention. For example, while an embodiment of the present invention is disclosed with reference to the application of a genetic algorithm, one having ordinary skill in the art will appreciate that other evolutionary or classifier algorithms may also be used.

What is claimed is:

1. A method comprising:
   providing a computer having memory for storing a first document and a second document;
   providing a first set of keywords from the first document;
   generating, by the computer, a confidence score for each of the keywords from the first set of keywords;
   selecting, by the computer, a first keyword from the first set of keywords based on a first confidence score;
   receiving a user modification of a keyword selected from the first set of keywords;
   providing a second set of keywords from the second document;
   generating a confidence score for each of the keywords from the second set of keywords;
   selecting a second keyword from the second set of keywords based on a second confidence score; and
   combining the first keyword from the first set of keywords and the second keyword from the second set of keywords to generate a third set of keywords.

2. The method of claim 1, wherein the computer provides at least one keyword in the second set of keywords.

3. The method of claim 1, wherein a user provides at least one keyword in the second set of keywords.

4. The method of claim 1, wherein the computer provides all of the keywords in the second set of keywords.

5. The method of claim 1, wherein a user provides all of the keywords in the second set of keywords.

6. The method of claim 1, wherein the user modification is received before combining the first keyword from the first set of keywords and the second keyword from the second set of key words to generate the third set of keywords.

7. The method of claim 1, wherein the first keyword selected from the first set of keywords has the highest confidence score out of all the keywords from the first set.

8. The method of claim 1, wherein the second keyword selected from the second set of keywords has the highest confidence score out of all the keywords from the second set.

9. The method of claim 1, further comprising exporting the third set of keywords as a XML file.

10. The method of claim 1, wherein generating a confidence score comprises calculating the number of times a keyword appears in a document divided by the total number of words in the document.

11. A computer program product, comprising a non-transitory computer usable medium having a computer readable program code embodied therein, said computer readable program code adapted to be executed by one or more processors to implement a method comprising:
    storing a first document and a second document;
    providing a first set of keywords from the first document;
    generating a confidence score for each of the keywords from the first set of keywords;
    selecting a first keyword from the first set of keywords based on a first confidence score;
    receiving a user modification of the at least one keyword selected from the first set of keywords;
    providing a second set of keywords from the second document;
    generating a confidence score for each of the keywords from the second set of keywords;
    selecting a second keyword from the second set of keywords based on a second confidence score; and
    combining the first keyword from the first set of keywords and the second keyword from the second set of keywords to generate a third set of keywords.

12. The computer program product of claim 11, wherein a computer provides at least one keyword in the second set of keywords.

13. The computer program product of claim 11, wherein a user provides at least one keyword in the second set of keywords.

14. The computer program product of claim 11, wherein a computer provides all of the keywords in the second set of keywords.

15. The computer program product of claim 11, wherein a user provides all of the keywords in the second set of keywords.

16. The computer program product of claim 11, wherein the user modification is received before combining the first keyword from the first set of keywords and the second keyword from the second set of key words to generate the third set of keywords.

17. The computer program product of claim 11, wherein the first keyword selected from the first set of keywords has the highest confidence score out of all the keywords from the first set.

18. The computer program product of claim 11, wherein the second keyword selected from the second set of keywords has the highest confidence score out of all the keywords from the second set.

19. The computer program product of claim 11, further comprising exporting the third set of keywords as a XML file.

20. The computer program product of claim 11, wherein generating a confidence score comprises calculating the number of times a keyword appears in a document divided by the total number of words in the document.

* * * * *